United States Patent
Sawada et al.

(10) Patent No.: US 6,721,062 B1
(45) Date of Patent: Apr. 13, 2004

(54) COLOR IMAGE PROCESSING APPARATUS USING PULSE WIDTH MODULATION

(75) Inventors: Takayuki Sawada, Tokyo (JP); Shinsaku Ito, Yokohama (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/468,927

(22) Filed: Dec. 22, 1999

(30) Foreign Application Priority Data

Dec. 22, 1998 (JP) .......................................... 10-365487

(51) Int. Cl.⁷ ............................ G06K 15/00; H04N 1/46
(52) U.S. Cl. ......................... 358/1.9; 358/2.1; 358/3.23; 358/518; 358/521
(58) Field of Search ............................... 358/19, 2.1, 3.1, 358/3.13, 3.22, 3.23, 500, 515, 518, 521, 530

(56) References Cited

U.S. PATENT DOCUMENTS

| | | | |
|---|---|---|---|
| 4,109,278 A | * 8/1978 | Mendrala et al. | 358/22 |
| 5,200,817 A | 4/1993 | Birnbaum | 358/80 |
| 5,546,165 A | 8/1996 | Rushing et al. | 355/208 |
| 6,252,678 B1 | * 6/2001 | Shimizu | |
| 6,320,605 B1 | * 11/2001 | Ikeda | 347/252 |

FOREIGN PATENT DOCUMENTS

| | | | | |
|---|---|---|---|---|
| JP | 07212604 | * 8/1995 | | H04N/1/52 |
| JP | 8-168012 | 6/1996 | | H04N/1/60 |
| JP | 8-289150 | 11/1996 | | H04N/1/407 |
| JP | 9-222780 | 8/1997 | | G03G/15/05 |
| JP | 9-311520 | 12/1997 | | G03G/15/01 |
| JP | 11-136532 | 2/1999 | | H04N/1/00 |
| JP | 11-98358 | 4/1999 | | H04N/1/407 |
| JP | 11-146215 | 5/1999 | | H04N/1/60 |

\* cited by examiner

Primary Examiner—Jerome Grant, II
(74) Attorney, Agent, or Firm—Foley & Lardner (57) ABSTRACT

A color image processing apparatus using a gradation image recording method by pulse width modulation comprises a pulse width selection table determining section for determining a pulse width selection table for pulse width modulation, a gradation correction table determining section for determining a gradation correction table based on the determined pulse width selection table, a color conversion table determining section for determining a color conversion table based on the determined gradation correction table, and a color image processing section for correcting a given color image signal and outputting the corrected color image signal based on the determined color conversion table, the gradation correction table and the pulse width selection table. Consequently, a color image processing can be carried out more properly by determining each table and performing an image processing operation in order of a degree of freedom.

16 Claims, 8 Drawing Sheets

COLOR IMAGE PROCESSING APPARATUS USING PULSE WIDTH MODULATION

BACKGROUND OF THE INVENTION

The present invention relates to a color image processing apparatus and more particularly to a color image processing apparatus for adjusting a pulse width and the like by using a patch image.

In a so-called image forming apparatus such as a copying machine, a printer or the like, recently, color printing has become a mainstream and strict color density characteristics have correspondingly been required for a printing color density. For example, a color copying machine performs a color converting process for converting RGB image data input from a scanner into colorant primaries CMY image data to be output by using a colorant by means of a printer. In order to duplicate an image on a document by faithful color reproducing properties, it is necessary to properly adjust the characteristics of color conversion (color conversion parameter, color conversion table).

In order to faithfully duplicate, however, it is necessary to properly adjust gradation characteristics as well as color conversion. For example, image data input from a scanner has received distortion for respective RGB in a process of passing through a sensor and a filter. Also in a printer, moreover, gradation and colors which are to be output are sometimes varied by an environment (temperature and humidity), a deterioration with age and a manufacturing solid-state difference even if the same image data are given. In particular, gradation characteristics on the printer side are sensitively changed by various factors. Therefore, it is necessary to provide a mechanism for optimizing output gradation characteristics and color conversion characteristics on demand in an apparatus in order to keep good image reproducing properties.

As a method for obtaining the color conversion parameter, there has conventionally been known a method for reading a sample color patch output from an apparatus itself to collect RGB-CMY data pairs of patches having plural colors, thereby obtaining a coefficient of a conversion polynomial from the RGB into the CMY by using a method of least squares. This method regards the characteristics of an image processing section other than the color conversion as a black box and is based on the thought that an image can be ideally reproduced faithfully only by the inverse correction of the black box to be carried out by the color conversion.

On the other hand, there has also been known a technique for fixedly setting the color conversion parameter to adjust the output gradation characteristics by the same method as described above on a certain assumption. More specifically, a sample gradation patch output from an apparatus itself is read to collect C'-C, M'-M and Y'-Y data pairs of a plurality of gradation patches, thereby obtaining a coefficient of the gradation correcting equation of each of C, M and Y by using a method of least squares.

In practice, however, it is hard to obtain the image outputs of sufficient gradation and color reproducing properties even if the above-mentioned adjusting method is used. The reason is as follows. An image process from a scanner to a printer is constituted by inking, a gradation process (pseudo halftone process), a screen process and the like in addition to the color conversion. In these blocks, nonlinear distortions having various properties are to image data, respectively.

In the conventional image forming apparatus, accordingly, there has been a problem in that it is hard to collectively generate parameter for correcting the nonlinear distortions such as the color conversion process, the inking process, the gradation process, the screen process and the like.

BRIEF SUMMARY OF THE INVENTION

It is an object of the present invention to provide a color image processing apparatus for stepwise determining a plurality of parameters for correcting a distortion, thereby obtaining an output of a color image having excellent gradations and color producing properties.

The present invention provides a color image processing apparatus using a gradation image recording method by pulse width modulation, comprising pulse width selection table determining means for determining a pulse width selection table for pulse width modulation, gradation correction table determining means for determining a gradation correction table based on the pulse width selection table determined by the pulse width selection table determining means, color conversion table determining for determining a color conversion table based on the gradation correction table determined by the gradation correction table determining means, and color image processing means for correcting a given color image signal and outputting the corrected color image signal based on the color conversion table determined by the color conversion table determining means, the gradation correction table determined by the gradation correction table determining means and the pulse width selection table determined by the pulse width selection table determining means.

According to the present invention, as described above, it is possible to provide a color image processing apparatus in which when the color conversion table, the gradation correction table and the pulse width selection table are to be determined, the pulse width selection table having the lowest degree of freedom is first determined, and subsequently, the tables having a lower degree of freedom are sequentially determined to obtain an optimum correction value, thereby outputting color images having excellent gradations and color reproduction.

Furthermore, the features of the present invention are specified by the claims by taking an example using a plurality of image patches to determine each table. Consequently, it is possible to provide a color image processing apparatus capable of performing excellent image correction in the same way.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will be described below with reference to the drawings.

Figure 1:
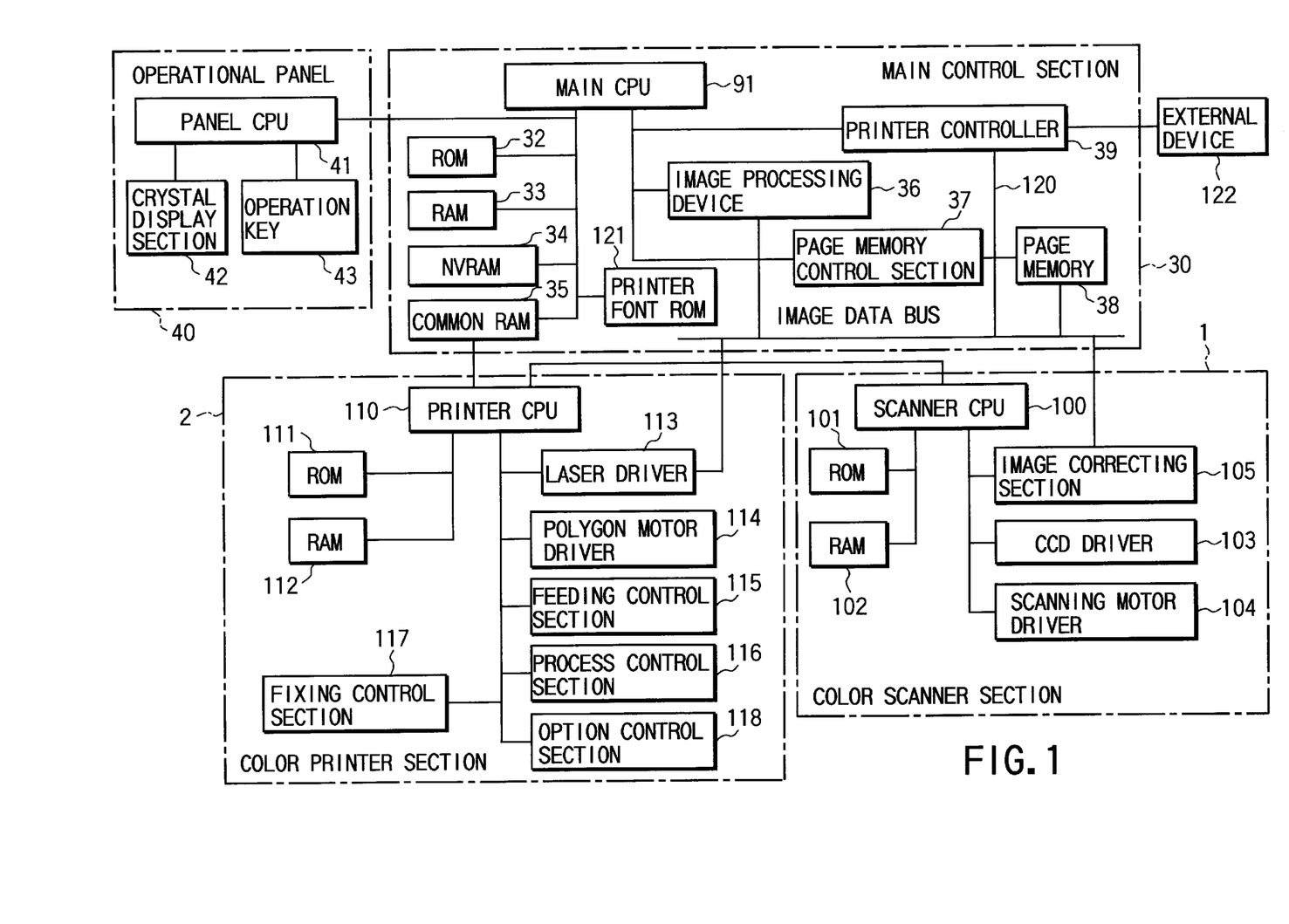
FIG. 1 is a block diagram showing an example of an image forming apparatus according to the present invention.

FIG. 1 is a block diagram schematically showing the flow of a signal for the electrical connection and control of a digital copying machine according to the present invention. In FIG. 1, a control system is constituted by three CPUs comprising a main CPU (central processing unit) 91 in a main control section 30, a scanner CPU 100 of a color scanner section 1, and a printer CPU 110 of a color printer section 2.

The main CPU 91 performs bi-directional communication through the printer CPU 110 and a common RAM (random access memory) 35, and gives an operation instruction so that the printer CPU 110 returns a condition status. The printer CPU 110 and the scanner CPU 100 performs serial communication, the printer CPU 110 gives an operation instruction and the scanner CPU 100 returns a condition status.

An operational panel 40 has a liquid crystal display section 42, various operation keys 43 and a panel CPU 41 connected to them, and is connected to a main CPU 91.

A main control section 30 is constituted by the main CPU 91, a ROM (read only memory) 32, a RAM 33, an NVRAM 34, a common RAM 35, an image processing section 36, a page memory control section 37, a page memory 38, a printer controller 39 and a printer font ROM121.

The main CPU 91 performs whole control. The ROM 32 stores a control program and the like. The RAM 33 temporarily stores data.

The NVRAM (nonvolatile RAM) 34 is a nonvolatile memory which is backed up on a battery (not shown), and holds storage data even if a power source is cut off.

The common RAM 35 is used for the bi-direction communication between the main CPU 91 and the printer CPU 110.

The page memory control section 37 stores and reads image information in and from the page memory 38. The page memory 38 has a region capable of storing image information for a plurality of pages, and data obtained by compressing image information from the color scanner section 1 are formed to be stored for one page.

Font data corresponding to print data are stored in a printer font ROM 121. The printer controller 39 serves to develop print data sent from an external apparatus 122 such as a personal computer into image data by using font data stored in the printer font ROM 121 with a resolution corresponding to data indicative of a resolution given to the print data.

The color scanner section 1 is constituted by a scanner CPU 100 for performing whole control, a ROM 101 for storing a control program and the like, a RAM 102 for data storage, a CCD driver 103 for driving a color image sensor 15, a scanning motor driver 104 for controlling the rotation of a scanning motor which moves a first carriage 8 and the like, an image correcting section 105 and the like.

The image correcting section 105 is constituted by an A/D converting circuit for converting R, G and B analog signals output from the color image sensor 15 into digital signals respectively, a shading correcting circuit for correcting a variation in the color image sensor 15 or a fluctuation in a threshold level for an output signal sent from the color image sensor 15, a line memory for temporarily storing the shading-correcting digital signal sent from the shading correcting circuit, and the like.

The color printer section 2 is constituted by a printer CPU 110 for performing whole control, a ROM 111 for storing a control program and the like, a RAM 112 for data storage, a laser driver 113 for driving a semiconductor laser oscillator 60, a polygon motor driver 114 for driving a polygon motor 54 of an exposing device 50, a delivery control section 115 for controlling the delivery of a paper P by a delivery mechanism 20, a process control section 116 for controlling a process for performing charging, developing and transferring operations by using a charger, a developing roller and a transferring device, a fixing control section 117 for controlling a fixing device 80, an option control section 118 for controlling an option, and the like.

The image processing section 36, the page memory 38, the printer controller 39, the image correcting section 105 and the laser driver 113 which have function as the features of the present invention are connected through an image data bus 120.

In an image forming apparatus having such a structure, the structure of the image processing section 36 for performing characteristic correction which is the feature of the present invention and a process for the characteristics correction will be described below in detail.

Figure 2:
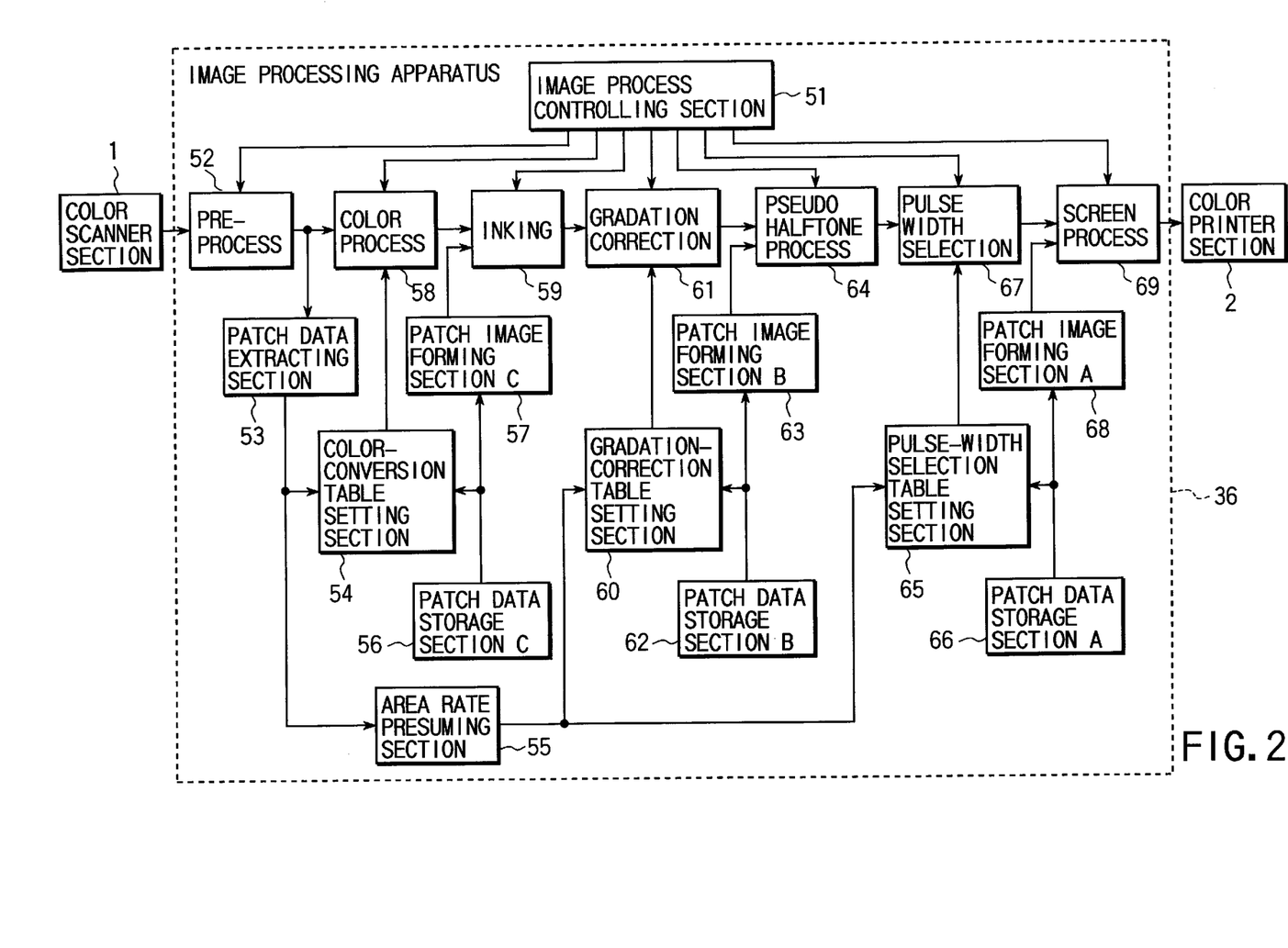
FIG. 2 is a block diagram showing the structure of an image processing apparatus according to the present invention.

FIG. 2 is a block diagram showing the structure of the image processing apparatus according to the present invention. In FIG. 2, the image processing apparatus according to the present invention is connected to the color scanner section 1 and the color printer section 2, respectively, and an image process control section 51, a pre-processing section 52, a patch data extracting section 53, a color conversion table setting section 54, an area rate presuming section 55, a patch data storing section C56, a patch data generating section C57, a color converting section 58, an inking section 59, a gradation correction table setting section 60, a gradation correcting section (output γ correcting section) 61, a patch data storage section B62, a patch image forming section B63, a pseudo halftone processing section 64, a pulse width selection table setting section 65, a patch data storage section A66, a pulse width selecting section 67, a patch image generating section A68 and a screen processing section 69 which are connected respectively as shown in FIG. 2.

First of all, the function of each section will be described below along the flow of data during ordinary image copy. An original is read to input GB image data in the color scanner section 1. The pre-processing section 52 performs shading correction and input γ correction for the image data supplied from the scanner. The color converting section 58 converts input image data expressed by a color light primaries (RGB) color space into image data expressed by a colorant primaries (CMY) color space. In the inking section 59, the amount of the colorant of block (K) is calculated (inked) from the CMY data, and the CMY amount is corrected (ink-replaced) based on the value of the generated K. For CMYK image data obtained after the inking, the output γ correcting section 61 gradation correction is carried out for each color channel. In a next pseudo halftone processing section 64 performs a pseudo halftone processing section such as multivalued error diffusion or the like. In a hexadecimal recording system, a hexadecimal error diffusion process is performed so that each pixel of output image data takes only sixteen values expressed by 4 bit of 0 to 15. In a next pulse width selecting section 67, a pulse width value of a laser driving signal for recording is selected for each level of 0 to 15. In a screen processing section 69, image data converted into a pulse width signal a process for converting image data is converted into a recording pattern having a screen angle for each color channel. In the color printer section (recording engine section) 2, a screen-processed image is output onto a paper. Other blocks in FIG. 2 will be described below together with the generating operation of each table.

Figure 3:
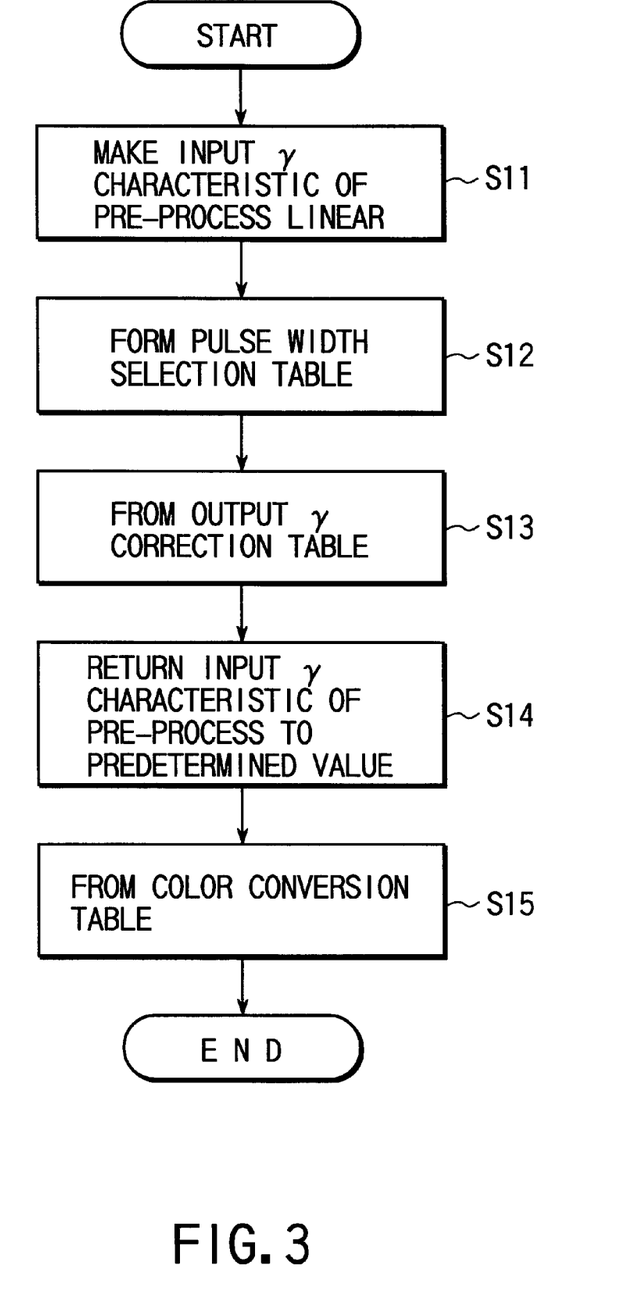
FIG. 3 is a flowchart showing a whole flow obtained when the present invention is carried out.

A series of operations for image process parameter table generation according to the present invention is shown in a flowchart of FIG. 3.

In the preferred embodiment of the present invention, three kinds of table, for example, a pulse width selection table, a gradation correction table and a color conversion table are generated in order shown in FIG. 3 by means of the above-mentioned image processing apparatus. More specifically, the input γ characteristic of the pre-process is first made linear (S11). Next, a pulse width selection table is generated by using a patch image or the like, for example (S12). Then, a gradation correction table is obtained by using the patch image or the like based on the pulse width selection table thus generated (S13). Finally, a color conversion table is generated by using the patch image or the like based on the gradation correction table thus generated (S14). In the present invention, thus, each table is generated based on the generated tables sequentially from a table which can be determined by a comparatively low degree of freedom and a simple policy. Consequently, it is possible to realize the reproducing properties of a correct input image which cannot be implemented in a conventional monotonic generating process.

The procedure for creating these three tables will be described below in detail with reference to a flowchart.

Figure 4:
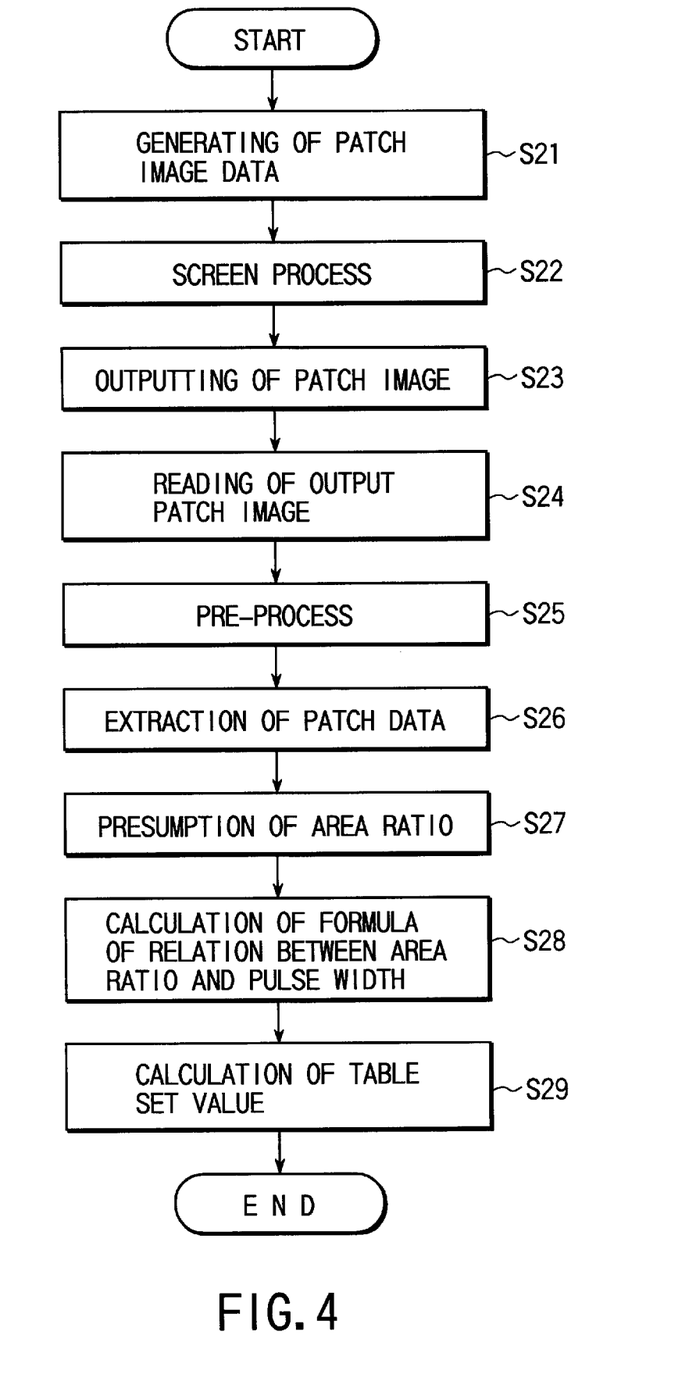
FIG. 4 is a flowchart showing pulse width selection table generation.
Figure 7:
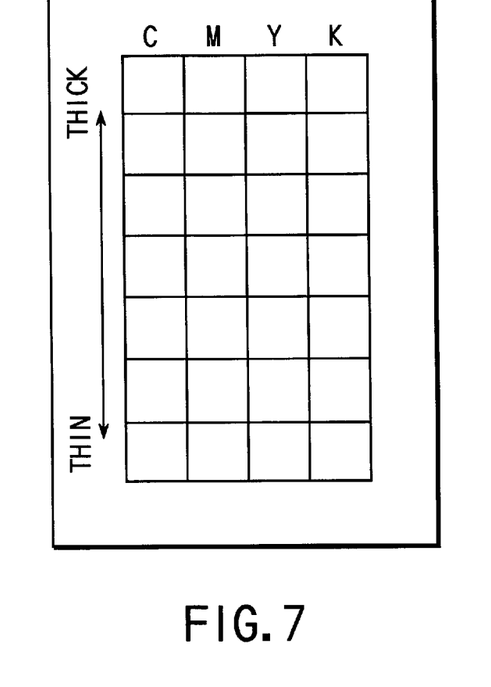
FIG. 7 is a plan view showing a patch image for the pulse width selection table generation and the gradation correction table generation.

FIG. 4 shows a generating flow of the pulse width selection table. First of all, a patch image for pulse width selection table generation is output (S21). Patch data for pulse width selection table generation is previously stored in the patch data storage section A. The patch data represents a pulse width. Each CMYK is set such that a plurality of patches obtained by changing a pulse width at regular intervals are arranged. The patch image generating section A generates the patch image data for pulse width selection table generation from a patch data group. FIG. 7 shows an example of the structure of a patch image. The patch image data is supplied to the screen processing section (S22). The screen processing section selects, as an input, image data from the patch image forming section A from a control signal sent from the image process control section. The patch image data is subjected to a screen angle process and is then output onto a paper (S23).

Figure 8:
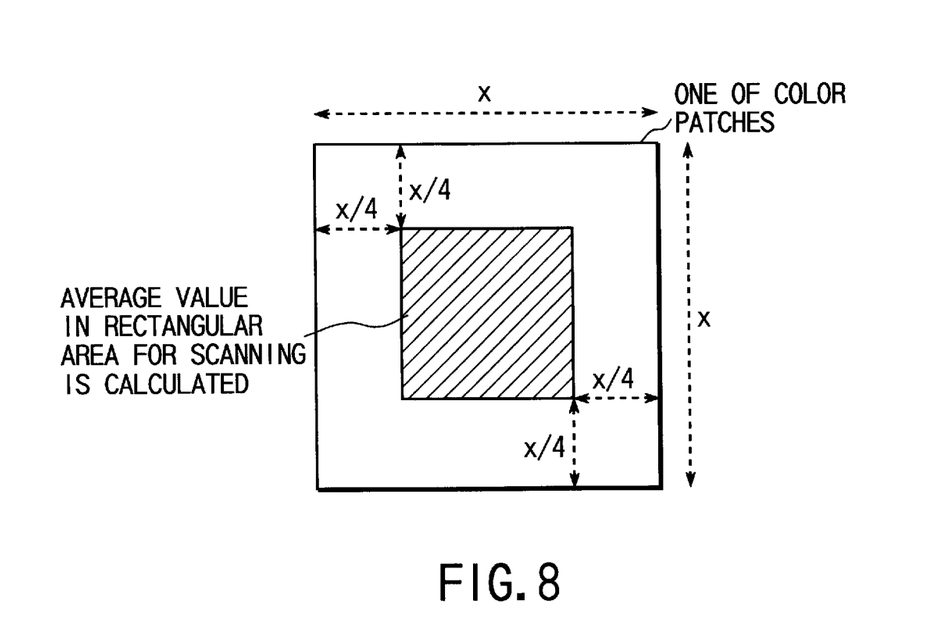
FIG. 8 is a diagram illustrating a state in which data is sampled from one patch.

Next, the output patch image for pulse width selection table generation is read by the scanner (S24). In that case, the image process control section sets and changes the input γ characteristic in the pre-processing section into a linear characteristic which is different from normal setting (S25). The reason is as follows. In order to presume an area rate from the read patch data by the area rate presuming section which will be described below, it is desirable that the read patch data should be proportional to the quantity of reflected light of the patch image. On the other hand, however, it is desirable that the input γ characteristic during normal copy should be proportional to the power of the quantity of reflected light. The patch image data input by the scanner is supplied to a patch data extracting section through the pre-process. The patch data extracting section performs the sampling of image data based on the print layout information of the preset patch and extracts the RGB value of each patch. In this case, in order to cancel the influence of noises, image data sampling sent from each patch is performed such that a large number of pixels as well as one pixel are cut out into a rectangular shape from the center of a patch and an average is taken by dividing each of the RGB by the number of cut-out rectangular pixels (see FIG. 8). Next, the CMYK recording area rate of the patch image is presumed from the extracted RGB patch data by the following equation (1).

$$\left.\begin{array}{l}C = 255 - R\\M = 255 - G\\Y = 255 - B\\K = 255 - (R + G + B)/3\end{array}\right\} \quad (1)$$

RGB and CMYK are expressed by 8 bit.

Finally, a pulse width selection table is generated based on the result of presumption of the area rate and the patch data stored in the patch data storage section A. First of all, a relationship between the presumed area rate and the pulse width is approximately calculated as an n-order polynomial indicated by Equation (2). In the Equation (2), a count value ak is calculated by using a method of least squares.

$$P = \sum_{k=0}^{n} a_k x^k \quad (2)$$

(x: area rate, p: pulse width)

Figure 9:
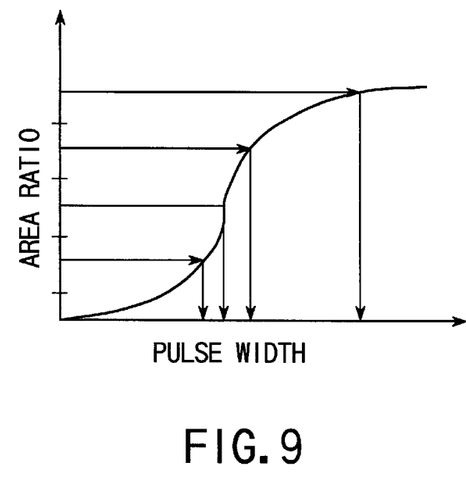
FIG. 9 is a graph showing an example of an area ratio obtained by polynomial approximation and a pulse width.

FIG. 9 shows an example of a curve representing the relationship between the pulse width thus calculated and the presumed area rate. The calculation of a pulse width selection table value is performed by dividing the axis of the area rate in FIG. 9 into the recording multi-valued number of equal portions (16 equal portions for hexadecimal error diffusion) and calculating the pulse width for each dividing point by the Equation (2).

For the generation of the pulse width selection table, thus, a table is generated based on a rule that is simple and easily realized in which a laser driving pulse width is assigned such that a recording area rate is changed linearly for each level (such that each level of limited gradation expresses the area rate) even if the gradation number is restricted, for example, hexadecimal, for example. Consequently, it is possible to keep the resolution of the gradation well over regions having variable densities. Thus, it is possible to implement gradation reproducing properties having no density distortion and halation so as to realize high resolution over all density range.

Figure 5:
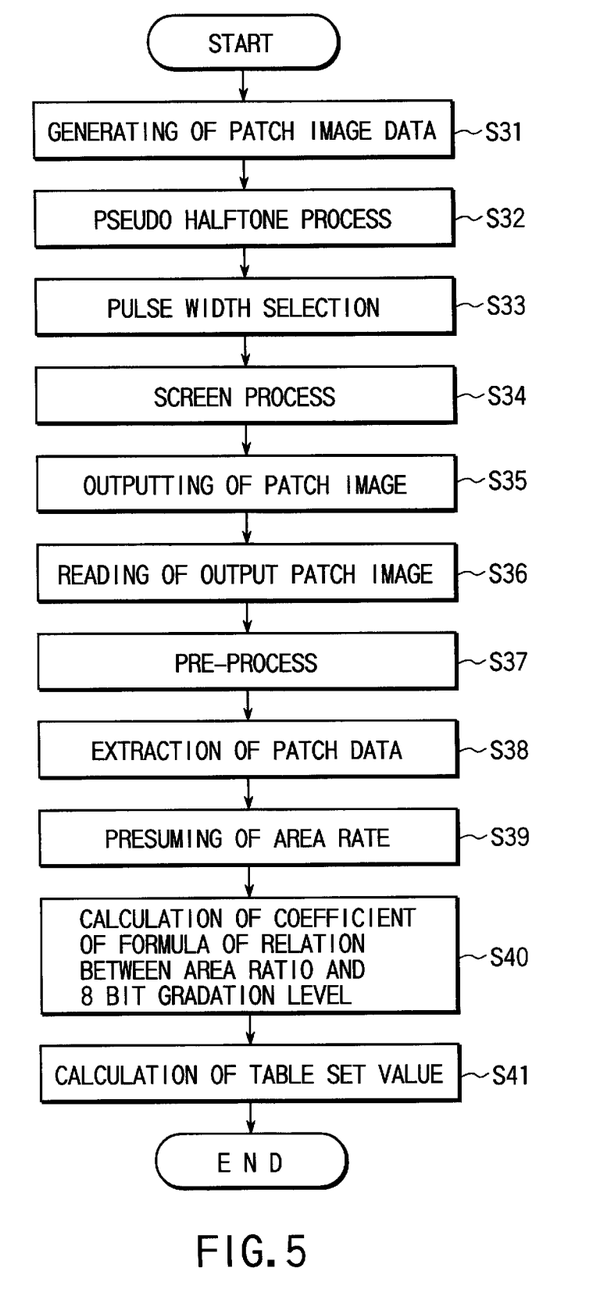
FIG. 5 is a flowchart showing gradation correction table generation.

FIG. 5 shows a generating flow of the gradation correction table. First of all, a patch image for gradation correction table is output. Patch data for gradation correction table generation is previously stored in the patch data storage section B. The patch data represents a gradation level of 8 bit to be supplied to the pseudo halftone processing section. Each CMYK is set such that a plurality of patches obtained by changing a gradation level at regular intervals are arranged. The patch image generating section B generates the patch image data for gradation correction table generation from a patch data group (S31). The layout image of the patch image is almost the same as in FIG. 7. The patch image data is supplied to the pseudo halftone processing section. The pseudo halftone processing section selects, as an input, image data from the patch image forming section B from a control signal sent from the image process control section. The patch image data is subjected to a pseudo halftone process (S32), a pulse width selection process (S33) using the set pulse width selection table and a screen process (S34) and is then output onto a paper (S35).

Next, the output patch image for gradation correction table generation is read by the scanner (S36). In that case, the image process control section sets and changes the input γ characteristic in the pre-processing section into a linear characteristic which is different from normal setting. The reason is the same as in the case of the pulse width selection table generation. The patch image data input by the scanner is supplied to the patch data extracting section through the pre-process (S37). The patch data extracting section performs the sampling of image data based on the print layout information of the preset patch, thereby extracting the RGB value of each patch (S38). In this case, in order to cancel the influence of noises, image data sampling sent from each patch is performed such that a large number of pixels as well as one pixel are cut out into a rectangular shape from the center of a patch and an average is taken by dividing each of the RGB by the number of cut-out rectangular pixels (see FIG. 8). Next, the CMYK recording area rate of the patch image is presumed from the extracted RGB patch data by the following equation (1) (S39).

In the gradation correction table setting section, finally, a gradation correction table is generated based on the result of presumption of the area rate and the patch data stored in the patch data storage section B (S41). First of all, a relationship between the presumed area rate and the 8-bit output gradation level is approximately calculated as an n-order polynomial indicated by Equation (3). In the Equation (3), a count value bk is calculated by using a method of least squares (S40).

$$L = \sum_{k=0}^{n} b_k x^k \quad (3)$$

(x: area rate, L: 8-bit output graduation level)

Figure 10:
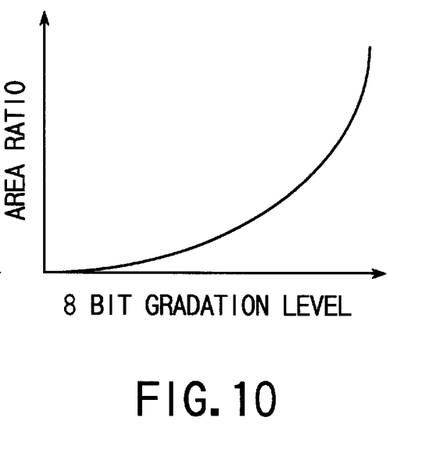
FIG. 10 is a graph showing an example of the area ratio obtained by the polynomial approximation and an 8-bit gradation level.

FIG. 10 shows an example of a curve representing the relationship between the 8-bit output gradation level thus calculated and the presumed area rate. The calculation of a gradation correction table value is performed by dividing the axis of the area rate in FIG. 10 into 256 to obtain the 8-bit gradation level of equal points by the Equation (3).

Figure 6:
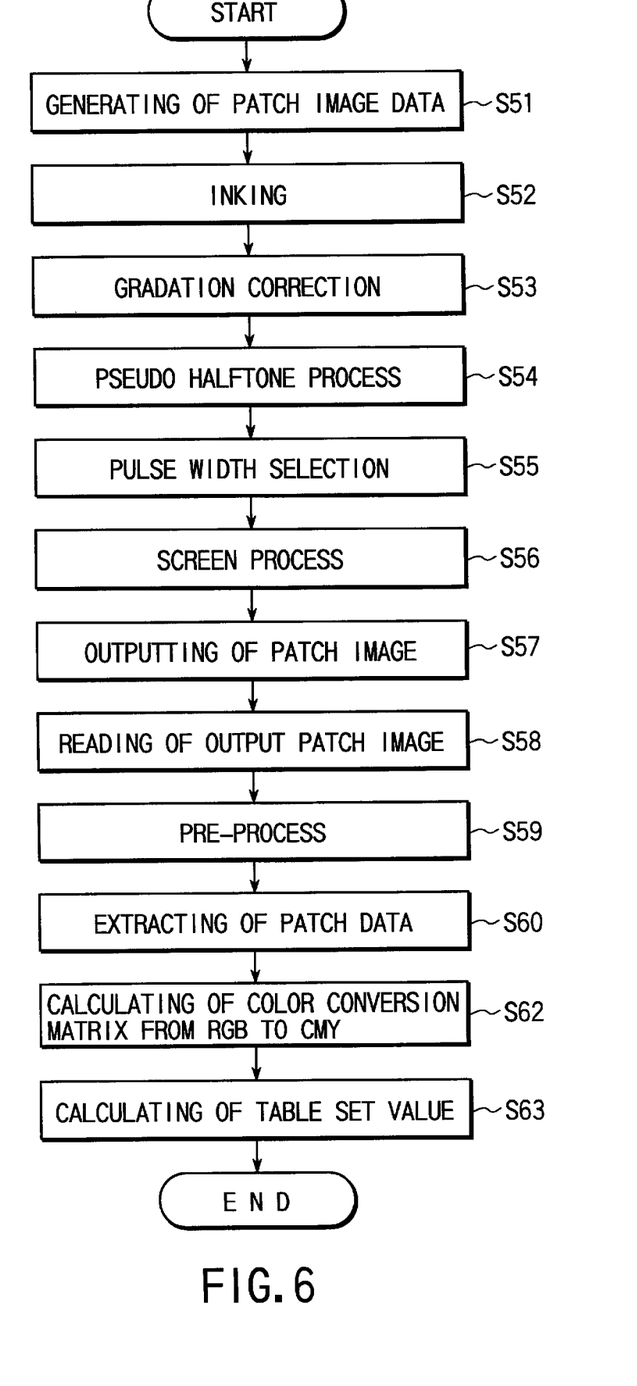
FIG. 6 is a flowchart showing color conversion table generation.
Figure 11:
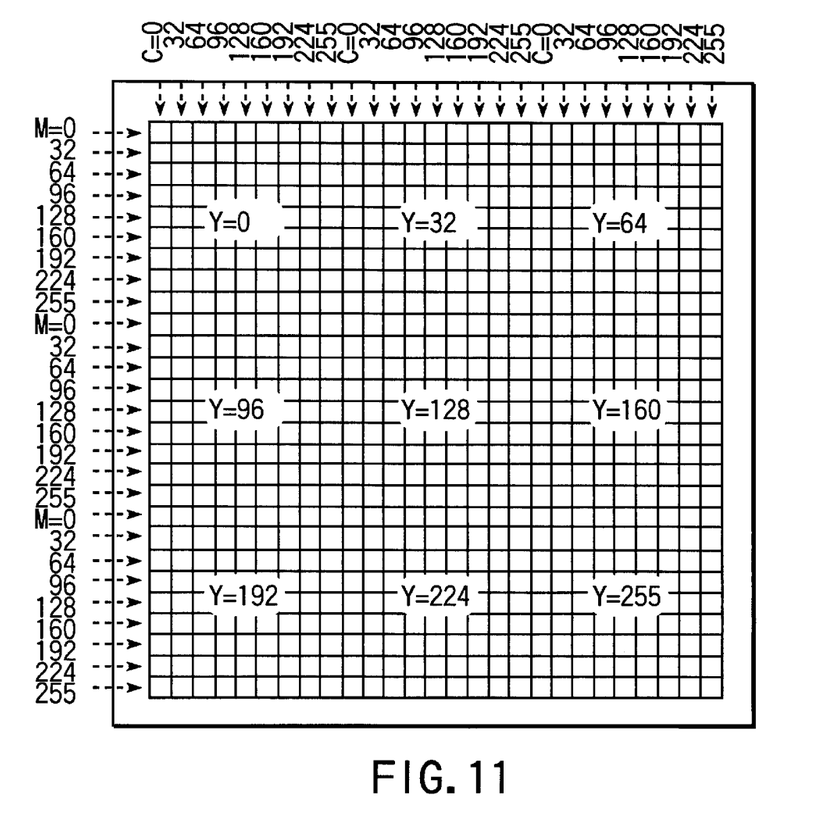
FIG. 11 is a plan view showing an example of a patch image for the color conversion table generation.

Finally, FIG. 6 shows a generating flow of the color conversion table. First of all, a patch image for color conversion table generation is output (S51). Patch data for color conversion table generation is previously stored in the patch data storage section C. The patch data represents an 8-bit area rate of 8 bit of the CMY, and is set such that a plurality of color patches obtained by combining CMY having area rates changed at regular intervals are arranged. The patch image generating section C generates the patch image data for color conversion table generation from a patch data group. FIG. 11 shows an example of the structure of the patch for color conversion table generation. The patch image data is supplied to the inking section. The inking section selects, as an input, image data from the patch image forming section C from a control signal sent from the image process control section. The patch image data is subjected to an inking process (S52), gradation correction using the set gradation correction table (S53), a pseudo halftone processing (S54), a pulse width selection process using the set pulse width selection table (S55), and a screen process (S56), and is output onto a paper (S57).

Next, the output patch image for color conversion table generation is read by the scanner (S58). In that case, the input γ characteristic in the pre-processing section is set to normal copy (S59). The reason is as follows. The RGB data itself which sent from the pre-processing section is an input and the table generation flow is started from the patch data representing the area rate as described above. Therefore, it is not necessary to presume the area rate. The image data input by the scanner is supplied to the patch data extracting section through the pre-process (S60). The patch data extracting section performs the sampling of image data based on the print layout information of the preset patch, thereby extracting the RGB value of each patch. In this case, in order to cancel the influence of noises, image data sampling sent from each patch is performed such that a large number of pixels as well as one pixel are cut out into a rectangular shape from the center of a patch and an average is taken by dividing each of the RGB by the number of cut-out rectangular pixels (see FIG. 8).

Next, the color conversion matrix from RGB to CMY is calculated (S62).

In the color conversion table setting section, finally, a color conversion table is generated based on the extracted patch data and the patch data stored in the patch data storing section C (S63).

As described above, the present invention features that the pulse width selection table, the gradation correction table and the color conversion table, that is, tables which has a low degree of freedom of a process and can be determined according to a simple policy are sequentially generated previously, and a table having a high degree of freedom of a process is then generated in consideration of the values of the determined tables, thereby generating and setting each table of an image process.

In the generation of the pulse width selection table, thus, even if the gradation number is limited, for example, hexadecimal, for example, the table can be generated based on a simple rule that can be easily realized in which a laser driving pulse width is assigned such that a recording area rate is changed linearly for each level (that is, each level of the limited gradation represents the area rate). Consequently, it is possible to keep the resolution of the gradation over all regions having various densities. Consequently, it is possible to implement gradation reproducing properties having no density distortion and halation so as to realize high resolution over all density range.

In the generation of the gradation correction table, furthermore, the CMYK value of an 8-bit 256 gradation which is the output of the inking is set to the area rate. The area rate passes through the gradation correcting process and the pseudo halftone process, thereby generating a table to be converted into the limited gradation level corresponding to the area rate during the generation of the pulse width selection table. On the other hand, the pulse width selection table has already been generated such that an image is output with the area rate corresponding to the limited gradation level which is the output of the pseudo halftone process. After all, the area rate is preserved from the inking output to the final output image.

Thus, the matching operation of the density of each CMYK is completely carried out in processes which are independently divided for each CMYK after the inking output in the process from the pulse width selection table generation to the gradation correction table generation. Accordingly, in the residual color conversion table generation, it is sufficient that color matching is realized for a short section from the latter stage of the pre-processing section to the inking output. More specifically, it is necessary to correct a distortion received by the process after the inking output. Consequently, it is possible to easily perform a table which is excellent in the precision of color reproducing properties.

According to the present invention, moreover, there is provided the image process control means for changing the input γ characteristics in the pre-process in the former stage for the extraction of the patch data from the characteristic obtained during the normal copy into the linear characteristic when reading the patch image by the scanner during the generation of the pulse width selection table and the gradation correction table. Therefore, it is possible to presume an area rate necessary for the table generation with high precision.

As described above in detail, according to the present invention, the image process parameter table is successively generated in order of the pulse width selection table, the gradation correction table and the color conversion table. Consequently, the parameter table which can be adjusted is dispersed into a plurality of necessary portions on the image process flow. Thus, it is possible to generate individual tables according to comparatively simple aims or rules. It is possible to provide an image forming apparatus capable of obtaining the excellent reproducing properties of gradations and colors by an image process parameter generated in this procedure.

Also in the case where only respective tables are obtained, it is possible to provide an image forming apparatus capable of the excellent reproducing properties of gradations and colors which have not conventionally been obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image processing apparatus using a gradation image recording method by pulse width modulation, comprising:
   pulse width selection table determining means for determining a pulse width selection table for pulse width modulation;
   gradation correction table determining means for determining a gradation correction table based on the pulse width selection table determined by the pulse width selection table determining means;
   color conversion table determining means for determining a color conversion table based on the gradation correction table determined by the gradation correction table determining means; and
   color image processing means for correcting a given color image signal and outputting the corrected color image signal based on the color conversion table determined by the color conversion table determining means, the gradation correction table determined by the gradation correction table determining means and the pulse width selection table determined by the pulse width selection table determining means.

2. A color image processing apparatus according to claim 1, wherein the pulse width selection table determining means includes:
   patch image output means for outputting a patch image to determine the pulse width selection table for the pulse width modulation;
   pulse width selection table determining means for determining the pulse width selection table based on patch image data reading the patch image output by the patch image output means; and
   means for processing and outputting a given color image signal based on the pulse width selection table determined by the pulse width selection table determining means.

3. A color image processing apparatus according to claim 1, wherein the pulse width selection table determining means includes:
   first patch image output means for outputting a first patch image to determine the pulse width selection table for the pulse width modulation;
   pulse width selection table determining means for determining the pulse width selection table based on patch image data reading the first patch image output by the first patch image output means; and
   means for processing and outputting a given color image signal based on the pulse width selection table determined by the pulse width selection table determining means,
   and wherein the gradation correction table determining means includes:
   second patch image output means for outputting, based on the pulse width selection table, a second patch image for determining the gradation correction table for the gradation correction;
   gradation correction table determining means for determining the gradation correction table based on patch image data reading the second patch image output by the second patch image output means; and
   means for processing and outputting a given color image signal based on the gradation correction table determined by the gradation correction table determining means and the pulse width selection table determined by the pulse width selection table determining means.

4. A color image processing apparatus according to claim 1, wherein the pulse width selection table determining means includes:
   first patch image output means for outputting a first patch image to determine the pulse width selection table for the pulse width modulation;
   pulse width selection table determining means for determining the pulse width selection table based on patch image data reading the first patch image output by the first patch image output means; and
   means for processing and outputting a given color image signal based on the pulse width selection table determined by the pulse width selection table determining means;

and wherein the gradation correction table determining means includes:

second patch image output means for outputting, based on the pulse width selection table, a second patch image for determining the gradation correction table for the gradation correction;

gradation correction table determining means for determining the gradation correction table based on patch image data reading the second patch image output by the second patch image output means; and means for processing and outputting a given color image signal based on the gradation correction table determined by the gradation correction table determining means and the pulse width selection table determined by the pulse width selection table determining means;

and wherein the color conversion table determining means includes:

third patch image output means for outputting a third patch image to determine the color conversion table for the color conversion based on the gradation correction table and the pulse width selection table;

color conversion table determining means for determining the color conversion table based on the patch image data reading the third patch image output by the third patch image output means; and means for processing and outputting a given color image signal based on the color conversion table determined by the color conversion table determining means, the pulse width correction table determined by the determining means and the gradation correction table determined by the gradation correction table determining means.

5. A color image processing apparatus according to claim 1, wherein the pulse width selection table determining means includes:

patch image output means for outputting a patch image to determine the pulse width selection table for the pulse width modulation;

pre-processing means for receiving the patch image output from the patch image output means, thereby performing a pre-process of shading correction or γ correction by setting which is different from normal image formation;

pulse width selection table determining means for determining the pulse width selection table based on the patch image data subjected to the pre-process by the pre-processing means; and means for processing and outputting a given color image signal based on the pulse width selection table determined by the pulse width selection table determining means.

6. A color image processing apparatus according to claim 1, wherein the pulse width selection table determining means includes:

patch image output means for outputting a patch image to determine the pulse width selection table for the pulse width modulation;

pulse width selection table determining means for determining the pulse width selection table for converting a density signal having a given stepwise magnitude into the pulse width in order to obtain a stepwise density image proportional to the density signal based on patch image data reading the patch image output by the patch image output means; and means for processing and outputting a given color image signal based on the pulse width selection table determined by the pulse width selection table determining means.

7. A color image processing apparatus according to claim 1, wherein the color image processing means includes:

color converting means for performing color conversion based on the determined color conversion table for the given color image signal;

gradation correcting means for performing gradation correction based on the determined gradation correction table for the color image signal subjected to the color conversion by the color converting means; and processing means for processing and outputting the color image based on the determined pulse width table for the color image signal subjected to the gradation correction by the gradation correcting means.

8. A color image processing apparatus according to claim 1, wherein the pulse width selection table determining means includes:

patch image output means for outputting a first patch image to determine the pulse width selection table for the pulse width modulation;

pulse width selection table determining means for determining the pulse width selection table based on patch image data reading the first patch image output by the patch image output means; and first color image processing means for processing and outputting a given color image signal based on the pulse width selection table determined by the pulse width selection table determining means;

and wherein the gradation correction table determining means includes:

patch image outputting means for outputting, based on the pulse width selection table, a second patch image to determine the gradation correction table for the gradation correction;

pre-processing means for performing a pre-process of shading correction or γ correction by setting which is different from normal image formation based on patch image data reading the second patch image output from the patch image output means;

gradation correction table determining means for determining the gradation correction table based on the patch image data subjected to the pre-process by the pre-processing means; and color image processing means for processing and outputting a given color image signal based on the gradation correction table determined by the gradation correction table determining means and the pulse width selection table determined by the pulse width selection table determining means.

9. A color image processing apparatus using a gradation image recording method by pulse width modulation, comprising:

first path image output means for outputting a patch image to determine a pulse width selection table for the pulse width modulation;

first fetching means for fetching patch image data by reading the patch image output from the first patch image output means;

pulse width selection table determining means for determining the pulse width selection table based on the patch image data given from the first fetching means;

color image processing means for processing and outputting a given color image signal based on the pulse width selection table determined by the pulse width selection table determining means;

second patch image output means for outputting a second patch image to determine a gradation correction table based on the pulse width selection tale determined by the pulse width selection table determining means;

second fetching means for fetching second patch image data by reading the second patch image output from the second patch image output means;

gradation correction table determining means for determining a gradation correction table based on the second patch image data given from the second fetching means; and color image processing means for processing and outputting a given color image signal based on the gradation correction table determined by the gradation correction table determining means and the pulse width selection table determined by the pulse width selection table determining means.

10. A color image processing apparatus using a gradation image recording method by pulse width modulation, comprising:

first path image output means for outputting a patch image to determine a pulse width selection table for the pulse width modulation;

first fetching means for fetching patch image data by reading the patch image output from the first patch image output means;

pulse width selection table determining means for determining the pulse width selection table based on the patch image data given from the first fetching means;

color image processing means for processing and outputting a given color image signal based on the pulse width selection table determined by the pulse width selection table determining means;

second patch image output means for outputting a second patch image to determine a gradation correction table based on the pulse width selection to be determined by the pulse width selection table determining means;

second fetching means for fetching second patch image data by reading the second patch image output from the second patch image output means;

gradation correction table determining means for determining a gradation correction table based on the second patch image data given from the second fetching means;

third patch image output means for outputting a third patch image to determine a color conversion table for the color conversion based on the gradation correction table and the pulse width selection table;

color correction table determining means for determining the color correction table based on patch image data reading the third patch image output by the third patch image output means; and means for processing and outputting a given color image signal based on the color correction table determined by the color correction table determining means and the pulse width selection table determined by the pulse width selection table determining means.

11. A color image processing apparatus using a gradation image recording method by pulse width modulation, comprising:

path image output means for outputting a patch image to determine a pulse width selection table for the pulse width modulation;

fetching means for fetching patch image data by reading the patch image output from the patch image output means;

pulse width selection table determining means for determining the pulse width selection table based on the patch image data given from the fetching means;

color image processing means for processing and outputting a given color image signal based on the pulse width selection table determined by the pulse width selection table determining means;

wherein the pulse width selection table determining means includes:

pre-processing means for receiving the patch image output from the patch image output means, thereby performing a pre-process of shading correction or γ correction by setting which is different from normal image formation;

pulse width selection table determining means for determining the pulse width selection table based on the patch image data subjected to the pre-process by the pre-processing means; and means for processing and outputting a given color image signal based on the pulse width selection table determined by the pulse width selection table determining means.

12. A color image processing apparatus using a gradation image recording method by pulse width modulation, comprising:

color converting means for performing color conversion for a given color image;

gradation correction means for correcting a gradation for each color channel for the color image subjected to the color conversion by the color converting means;

pulse width selecting means for selecting a pulse width for each color channel for the color image subjected to the gradation correction by the gradation correcting means; and color image processing means for processing and outputting the color image based on a pulse width selected by the pulse width selecting means.

13. A color image processing apparatus using a gradation image recording method by pulse width modulation, comprising:

pulse width selection table determining means for determining a pulse width selection table for pulse width modulation;

gradation correction table determining means for determining a gradation correction table based on the pulse width selection table determined by the pulse width selection table determining means;

color conversion table determining means for determining a color conversion table based on the gradation correction table determined by the gradation correction table determining means for correcting a given color image signal and outputting the corrected color image signal based on the color conversion table determined by the color conversion table determining means, the gradation correction table determined by the gradation correction table determining means and the pulse width selection table determined by the pulse width selection table determining means, thereby forming and outputting the corrected image on an image forming medium.

14. A color image processing method using gradation image recording by pulse width modulation, the method comprising:

determining a pulse width selection table for pulse width modulation;

determining a gradation correction table based on the determined pulse width selection table;

determining a color conversion table based on the determined gradation correction table; and correcting a given color image signal and outputting the corrected color image signal based on the determined color conversion table, the determined gradation correction table, and the determined pulse width selection table.

15. A color image processing method using gradation image recording by pulse width modulation, the method comprising:

performing color conversion for a given color image;

correcting a gradation for each color channel for the color image subjected to the color conversion;

selecting a pulse width for each color channel for the color image subjected to the gradation correction; and processing and outputting the color image based on the selected pulse width.

16. A color image processing method using gradation image recording by pulse width modulation, the method comprising:

determining a pulse width selection table for pulse width modulation;

determining a gradation correction table based on the determined pulse width selection table;

determining a color conversion table based on the determined gradation correction table for correcting a given color image signal, and outputting the corrected color image signal based on the determined color conversion table, the determined gradation correction table, and the determined pulse width selection table, thereby forming and outputting the corrected image on an image forming medium.

* * * * *